(12) United States Patent
Kamizato

(10) Patent No.: US 11,888,371 B2
(45) Date of Patent: Jan. 30, 2024

(54) MANUFACTURING METHOD OF BUS BAR UNIT, BUS BAR UNIT, AND MOTOR

(71) Applicant: Nidec Corporation, Kyoto (JP)

(72) Inventor: Ryo Kamizato, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 62 days.

(21) Appl. No.: 17/665,626

(22) Filed: Feb. 7, 2022

(65) Prior Publication Data

US 2022/0271600 A1 Aug. 25, 2022

(30) Foreign Application Priority Data

Feb. 19, 2021 (JP) ................................. 2021-025475

(51) Int. Cl.
*H02K 11/01* (2016.01)
*H02K 3/52* (2006.01)
*H02K 21/16* (2006.01)
*H02K 15/00* (2006.01)

(52) U.S. Cl.
CPC ........... *H02K 3/522* (2013.01); *H02K 11/014* (2020.08); *H02K 15/0062* (2013.01); *H02K 21/16* (2013.01); *H02K 2203/09* (2013.01)

(58) Field of Classification Search
CPC ............ H02K 3/28; H02K 5/15; H02K 1/145; H02K 3/522; H02K 5/225; H02K 3/50; H02K 3/52
See application file for complete search history.

(56) References Cited

U.S. PATENT DOCUMENTS

| 11,522,415 | B2* | 12/2022 | Takahashi | H02K 11/215 |
| 2017/0005535 | A1* | 1/2017 | Gervais | H02K 3/18 |
| 2017/0093239 | A1* | 3/2017 | Teranishi | H02K 3/18 |
| 2021/0305870 | A1* | 9/2021 | Takahashi | H02K 5/08 |

FOREIGN PATENT DOCUMENTS

JP 6353723 B2 7/2018

* cited by examiner

*Primary Examiner* — Christopher M Koehler
*Assistant Examiner* — Leda T Pham
(74) *Attorney, Agent, or Firm* — Keating & Bennett, LLP

(57) ABSTRACT

A method of manufacturing of the bus bar assembly includes preparing a mold, positioning a bus bar and a shield in the mold, and molding a bus bar holder. The positioning includes inserting first positioning pins into bus bar through holes to cause the first positioning pins to hold the bus bar, providing the shield in the mold in a state where a lower surface of the shield and a distal end of the first positioning pin are in contact with each other, bringing a second positioning pin into contact with an upper surface of the shield and positioning the shield in a vertical direction, and bringing a third positioning pin extending downward from a lower surface of an upper mold into contact with an upper surface of the bus bar to position the bus bar in the vertical direction.

14 Claims, 10 Drawing Sheets

MANUFACTURING METHOD OF BUS BAR UNIT, BUS BAR UNIT, AND MOTOR

CROSS-REFERENCE TO RELATED APPLICATIONS

The present application claims priority under 35 U.S.C. § 119 to Japanese Patent Application No. 2021-025475, filed on Feb. 19, 2021, the entire contents of which are hereby incorporated herein by reference.

1. Field of the Invention

The present disclosure relates to a manufacturing method of a bus bar assembly, a bus bar assembly, and a motor.

2. Background

A motor including a bus bar assembly that connects an external power source terminal and a coil is known. Conventionally, a bus bar assembly in which bus bars and positioning members made of insulating resin are alternately stacked is known.

In the conventional configuration, the bus bar can be positioned in a planar direction by the positioning member, but it is difficult to position the bus bar in a direction in which the bus bar and the positioning member are stacked. In addition, since it is necessary to prepare a plurality of members dedicated to positioning, there are problems that the number of components is large and the cost of the components themselves is high.

SUMMARY

According to one example embodiment of the present disclosure, a manufacturing method of a bus bar assembly applicable to a connection between a coil in a motor and an external power source is provided. The bus bar assembly includes a bus bar made of a plate-shaped conductor, a plate-shaped shield to shield magnetism generated by the bus bar, and a bus bar holder to hold the bus bar and the shield. The bus bar includes an arc-shaped bus bar body portion held by the bus bar holder in a posture in which a plate surface is directed in a vertical direction, and bus bar through holes penetrating the bus bar in a plate thickness direction. The shield includes a portion overlapping the bus bar through holes when viewed from the vertical direction.

The method of manufacturing the bus bar assembly includes preparing a mold to insert-mold the bus bar and the shield, positioning the bus bar and the shield in the mold, and injecting a resin into the mold after the positioning to mold the bus bar holder.

The positioning includes inserting first positioning pins extending from an upper surface of a lower mold of the mold into the bus bar through holes to cause the first positioning pins to hold the bus bar, arranging the shield in the mold in a state in which a lower surface of the shield and a distal end of the first positioning pin are in contact with each other, bringing a second positioning pin extending from a lower surface of an upper mold of the mold into contact with an upper surface of the shield and positioning the shield in the vertical direction, and bringing a third positioning pin extending downward from the lower surface of the upper mold into contact with an upper surface of the bus bar to position the bus bar in the vertical direction.

According to one example embodiment of the present disclosure, there is provided a bus bar assembly to be connected between a coil in a motor and an external power source. Provided are a bus bar made of a plate-shaped conductor, a plate-shaped shield to shield magnetism generated by the bus bar, and a bus bar holder to hold the bus bar and the shield. The bus bar includes an arc-shaped bus bar body portion held by the bus bar holder in a posture in which a plate surface is directed in a vertical direction, and bus bar through holes penetrating the bus bar in a plate thickness direction. The shield includes a portion overlapping the bus bar through holes when viewed from the vertical direction. The bus bar holder includes first pin insertion holes that are open in a lower surface of the bus bar holder, extend upward, pass through the bus bar through holes, and reach a lower surface of the shield, a second pin insertion hole that opens in an upper surface of the bus bar holder, extends downward, and reaches an upper surface of the shield, and a third pin insertion hole that opens in the upper surface of the bus bar holder, extends downward, and reaches the upper surface of the bus bar.

According to one example embodiment of the present disclosure, there is provided a motor including a rotor rotatable about a center axis extending in a vertical direction, an annular stator located on a radial outside of the rotor, and a rotation position detector located above the stator to detect a rotation position of the rotor. The stator includes a stator body including a coil and a stator core, and a bus bar assembly located between the stator core and the rotation position detector. The bus bar assembly includes a bus bar made of a plate-shaped conductor, a plate-shaped shield to shield magnetism generated by the bus bar, and a bus bar holder to hold the bus bar and the shield. The bus bar includes an arc-shaped bus bar body portion held by the bus bar holder in a posture in which a plate surface is directed in the vertical direction, bus bar through holes penetrating the bus bar in a plate thickness direction, and a coil wiring portion and an external power source wiring portion respectively extending from different end portions of the bus bar body portion. The shield includes through hole shielding portions that individually overlap the bus bar through holes when viewed from the vertical direction. The external power source wiring portion extends linearly from the end portion of the bus bar body portion to an outer peripheral side when viewed from the vertical direction, and is provided along a width direction of the external power source wiring portion. Some of the through hole shielding portions are located in the external power source wiring portion, and others of the through hole shielding portions are located in the bus bar body portion or the coil wiring portion.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the drawings.

A motor 1 according to an example embodiment will be described with reference to FIGS. 1 to 5.

Figure 1:
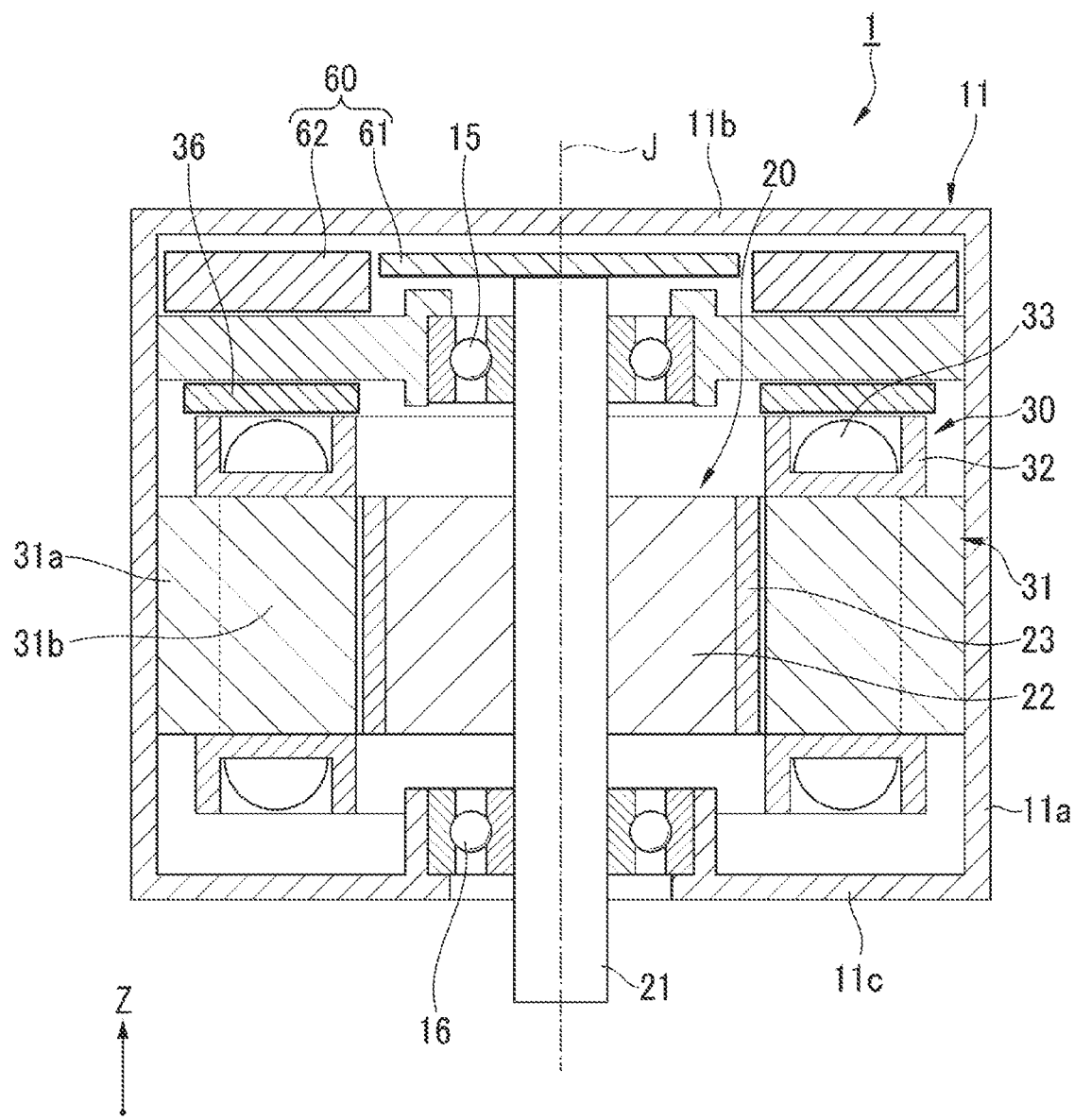
FIG. 1 is a sectional view of a motor according to an example embodiment of the present disclosure.

In the present example embodiment, a direction in which a center axis J of the motor 1 illustrated in FIG. 1 extends is simply referred to as an "axial direction". In the present example embodiment, the axial direction is a vertical direction. In the following example embodiment, an upper side (+Z) corresponds to one side in the axial direction, and a lower side (−Z) corresponds to the other side in the axial direction. A radial direction about the center axis J is simply referred to as a "radial direction". In the radial direction, a direction approaching the center axis J is referred to as a radial inside, and a direction separating from the center axis J is referred to as a radial outside. In the present example embodiment, the radial inside corresponds to one radial direction side, and the radial outside corresponds to the other radial direction side. A circumferential direction centered on the center axis J is simply referred to as a "circumferential direction".

The vertical direction, the upper side, and the lower side are merely names for describing a relative positional relationship between the respective units, and an actual layout relationship and the like may be other than the layout relationship indicated by these names.

The motor 1 of the present example embodiment is mounted on, for example, an electric power steering device (not illustrated). The electric power steering device is mounted on a steering mechanism of wheels of an automobile. The electric power steering device is a device that reduces steering force by a motor.

As illustrated in FIG. 1, the motor 1 of the present example embodiment includes a rotor 20 centered on a center axis J, a stator 30 disposed radially outside the rotor 20, a housing 11, a plurality of bearings 15 and 16, and a rotation position detector 60 that detects rotation of the rotor 20. The rotation position detector 60 is a resolver in the present example embodiment. The rotation position detector 60 includes a resolver rotor 61 and a resolver stator 62. The rotation position detector 60 is not limited to the resolver, and may be a system using a Hall element or an MR element.

The motor 1 is an inner rotor type motor. The rotor 20 rotates about the center axis J with respect to the stator 30. Although not particularly illustrated, the motor 1 may include a substrate that controls the rotation of the rotor 20.

The housing 11 accommodates therein the rotor 20 and the stator 30. The housing 11 is tubular extending in the axial direction. The housing 11 includes a circumferential wall 11a, a top wall 1ib, a bottom wall 11c, and a bearing holding wall portion 11d. The circumferential wall 11a is cylindrical extending in the axial direction. The top wall 1ib closes an upper opening of the circumferential wall 11a. The bottom wall 11c closes a lower opening of the circumferential wall 11a. The bottom wall 11c holds the bearing 16. The bearing holding wall portion 11d is fixed to the circumferential wall 11a. The bearing holding wall portion 11d holds the bearing 15.

The rotor 20 includes a shaft 21, a rotor core 22, and a magnet 23. The shaft 21 has a columnar shape extending in the axial direction. The shaft 21 may be cylindrical extending in the axial direction. The shaft 21 is supported by the plurality of bearings 15 and 16 so as to be rotatable about the center axis J. The plurality of bearings 15 and 16 are disposed at intervals in the axial direction, and are supported by the housing 11. That is, the shaft 21 is supported by the housing 11 via the plurality of bearings 15 and 16.

The shaft 21 protrudes upward from the bearing 15. The resolver rotor 61 is connected to an upper end of the shaft 21. The resolver rotor 61 is rotatable about the center axis J together with the shaft 21. The resolver stator 62 is disposed above the bearing holding wall portion 11d that holds the bearing 15. The resolver stator 62 has an annular shape surrounding the resolver rotor 61 from the radial outside. The resolver stator 62 is located above a bus bar assembly 36 to be described later.

The rotor core 22 has a tubular shape extending in the axial direction. An outer diameter of the rotor core 22 is larger than that of the shaft 21. The rotor core 22 has a smaller axial length than the shaft 21. An inner circumferential surface of the rotor core 22 is fixed to an outer circumferential surface of the shaft 21. The rotor core 22 is fixed to the shaft 21 by press fitting, bonding, or the like. The rotor core 22 is located between the pair of bearings 15 and 16 in the axial direction. The magnet 23 is fixed to an outer peripheral portion of the rotor core 22.

The stator 30 faces the rotor 20 with a gap therebetween in the radial direction. The stator 30 surrounds the rotor 20 from the radial outside over the entire circumference in the circumferential direction. The stator 30 has a stator core 31, an insulator 32, a coil 33, and a bus bar assembly 36.

The stator core 31 has an annular shape centered on the center axis J. The stator core 31 is tubular extending in the axial direction. The stator core 31 surrounds the rotor 20 from the radial outside. The stator core 31 is configured by stacking a plurality of electromagnetic steel plates in the axial direction. The stator core 31 is fixed to an inner circumferential surface of the housing 11. The stator core 31 and the housing 11 are fixed by shrink fitting, press fitting, or the like, for example.

The stator core 31 includes a core back 31a and a plurality of teeth 31b. The core back 31a is cylindrical about the center axis J. A radial outside surface of the core back 31a is fixed to an inner circumferential surface of the circumferential wall 11a. The teeth 31b extend from a radial inside surface of the core back 31a toward the radial inside. The plurality of teeth 31b are disposed at intervals in the circumferential direction. A radial inside surface of each of the teeth 31b faces a radial outside surface of the rotor 20 with a gap therebetween.

The insulator 32 is attached to the stator core 31. The insulator 32 is made of an insulating material. For example, the insulator 32 is made of resin. The insulator 32 is attached to each of the plurality of teeth 31b. The coil 33 is attached to the stator core 31 via the insulator 32. A plurality of coils 33 are provided side by side in the circumferential direction.

The motor 1 of the present example embodiment is a three-phase motor. The three phases are a U phase, a V phase, and a W phase. In the case of the three-phase motor, the U-phase, V-phase, and W-phase coils 33 are electrically connected to the bus bar assembly 36.

As illustrated in FIG. 1, the bus bar assembly 36 is located on the upper side (+Z side) of the stator core 31. In the case of the present example embodiment, the bus bar assembly 36 is located between the stator core 31 and the bearing holding wall portion 11d. The bus bar assembly 36 may be located above the bearing holding wall portion 11d. The bus bar assembly 36 overlaps the resolver stator 62 when viewed from the axial direction.

Figure 2:
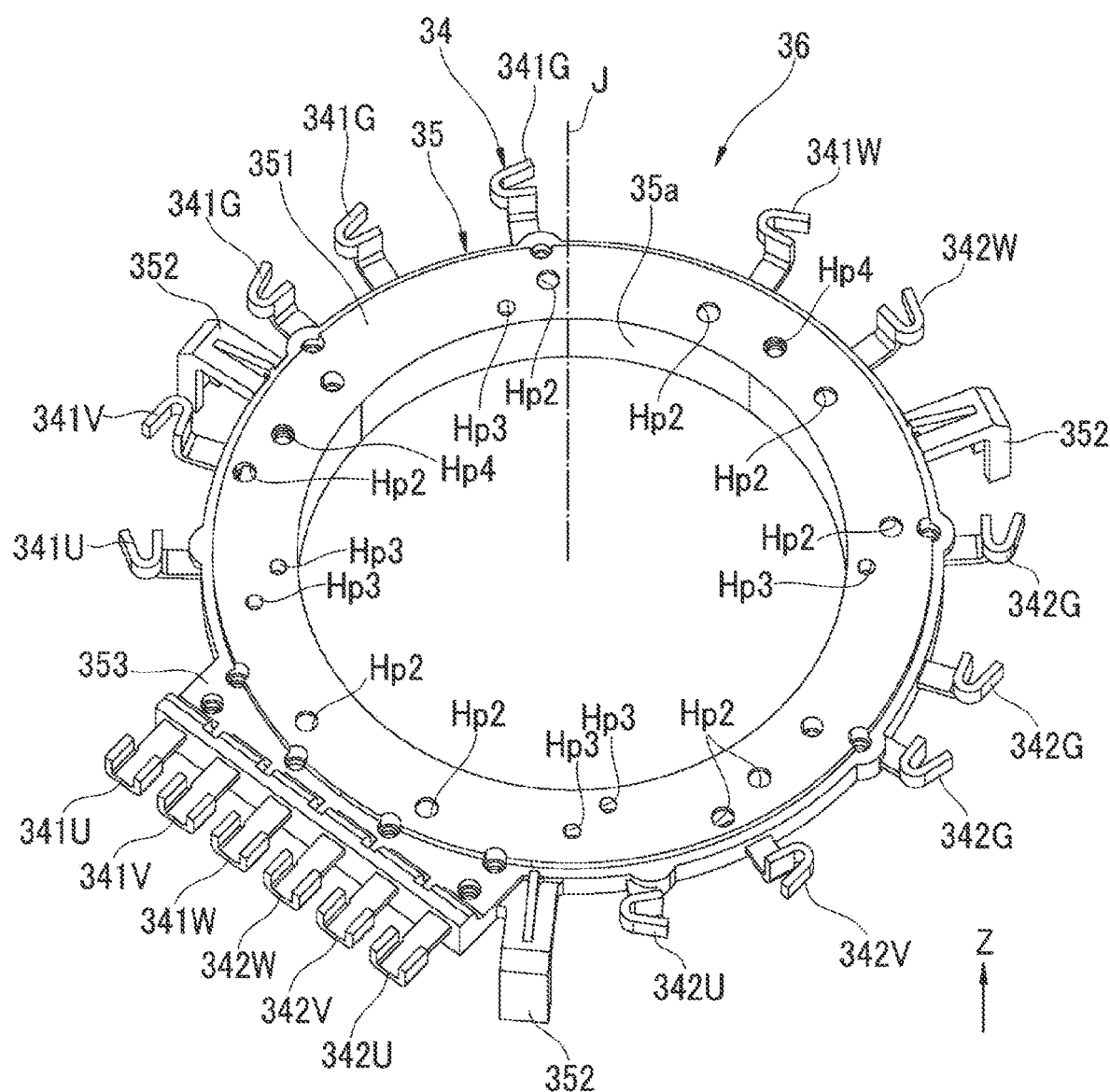
FIG. 2 is a perspective view of a bus bar assembly according to an example embodiment of the present disclosure.

As illustrated in FIG. 2, the bus bar assembly 36 includes a bus bar group 34 including a plurality of bus bars, and a bus bar holder 35 that holds the bus bar group 34. The bus bar group 34 includes eight bus bars 341U, 341V, 341W, 341G, 342U, 342V, 342W, and 342G. In the present example embodiment, the bus bar group 34 is insert-molded in the bus bar holder 35.

Figure 3:
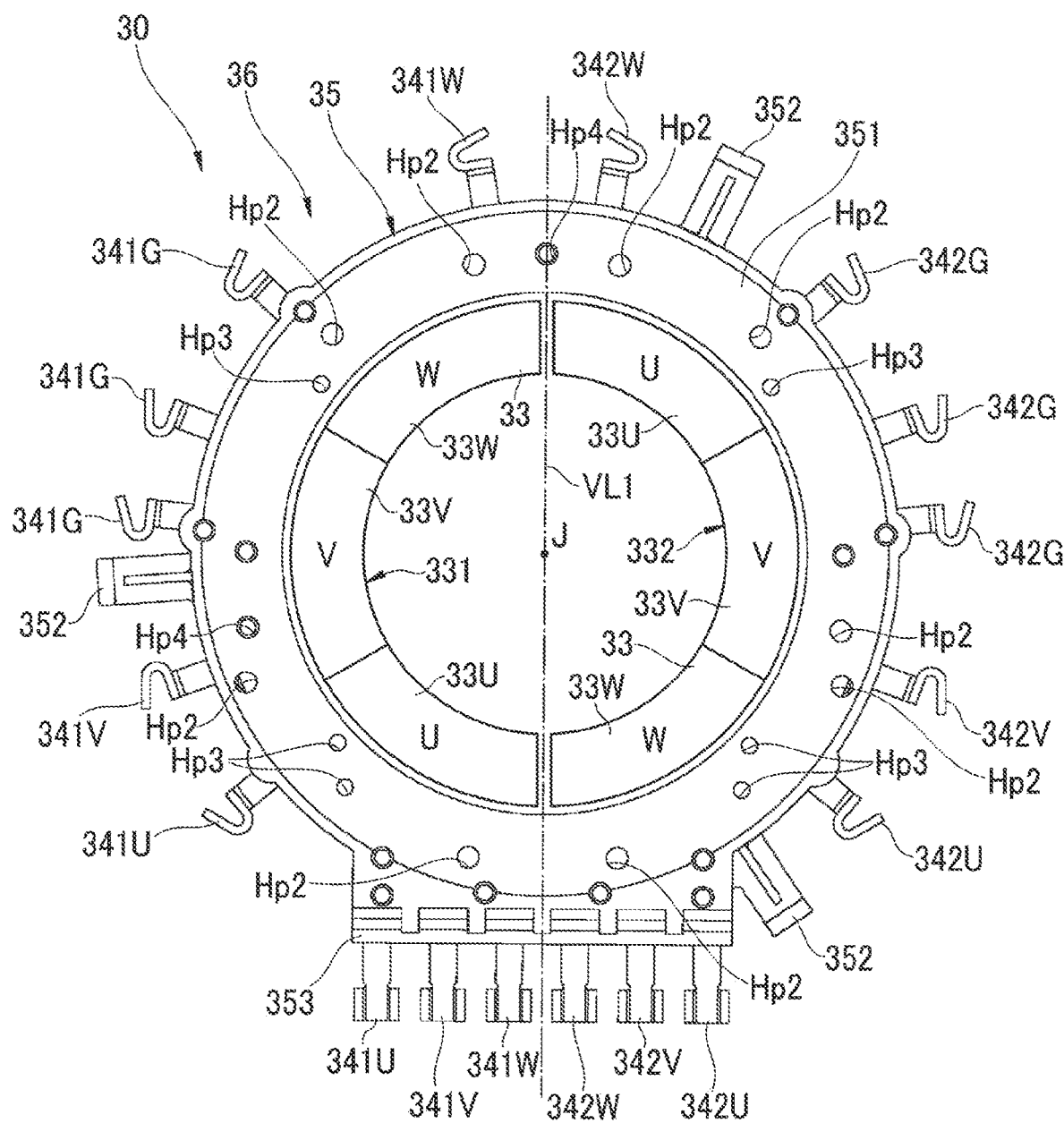
FIG. 3 is a plan view of the bus bar assembly as viewed from above.
Figure 5:
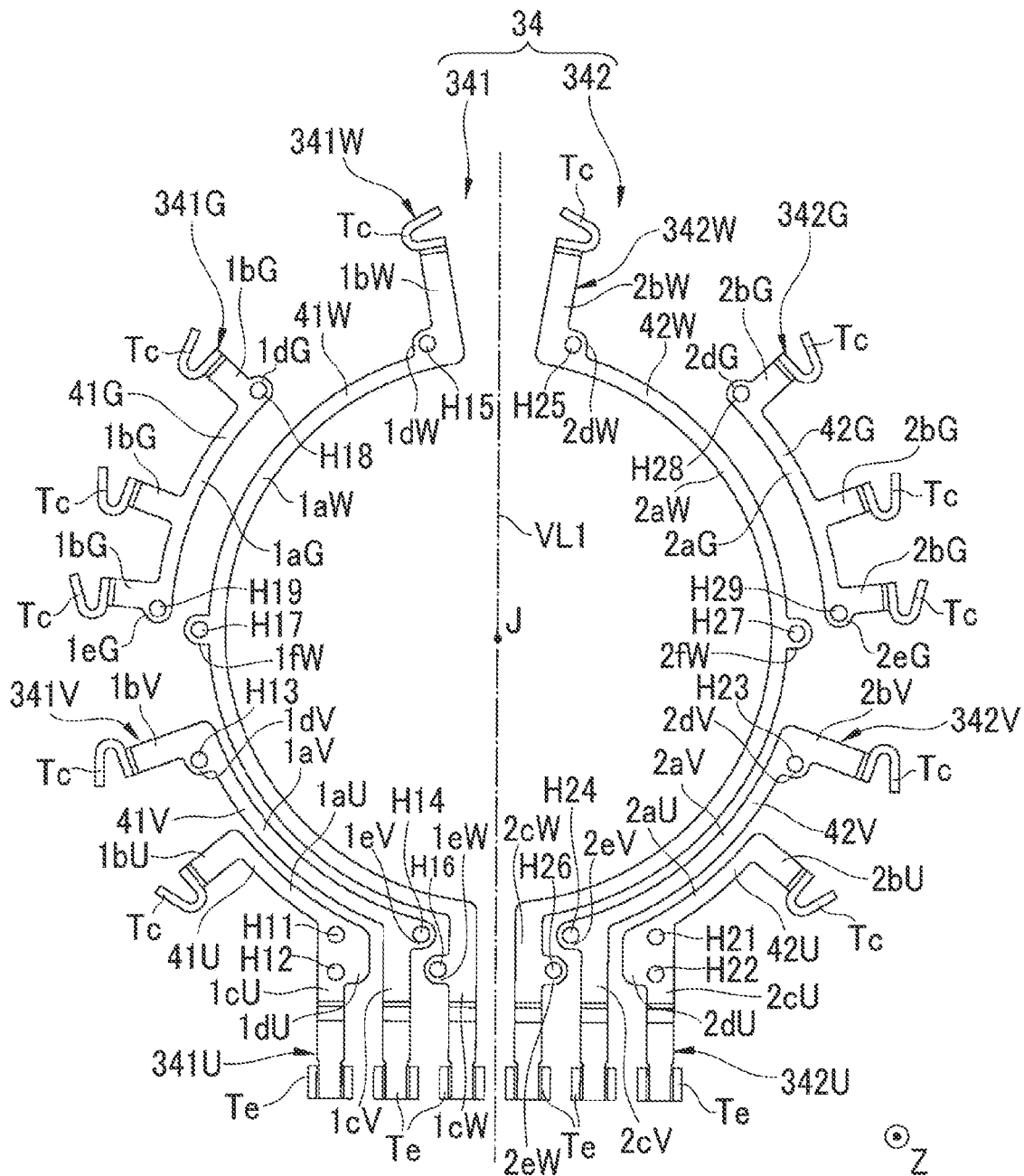
FIG. 5 is a plan view of a bus bar group according to an example embodiment of the present disclosure as viewed from above.

As illustrated in FIG. 3, the bus bar holder 35 includes an annular holder body 351 when viewed from the axial direction, three support leg portions 352 protruding to the radial outside from an outer circumferential surface of the holder body 351, and a connector portion 353 protruding to the radial outside from the outer circumferential surface of the holder body 351. The bus bar holder 35 has an inner hole 35a extending along the center axis J. The bus bar holder 35 is made of a resin. End portions of the plurality of bus bars protrude to the radial outside from an outer circumferential surface of the bus bar holder 35. FIG. 5 illustrates the bus bar group 34 disposed to be held by the bus bar holder 35. Each of the bus bars constituting the bus bar group 34 extends along the circumferential direction inside the bus bar holder 35, and a connection terminal portion to be described later and at least a part of a coil wiring portion and an external power source wiring portion to be described later are exposed to the outside of the bus bar holder 35.

Figure 4:
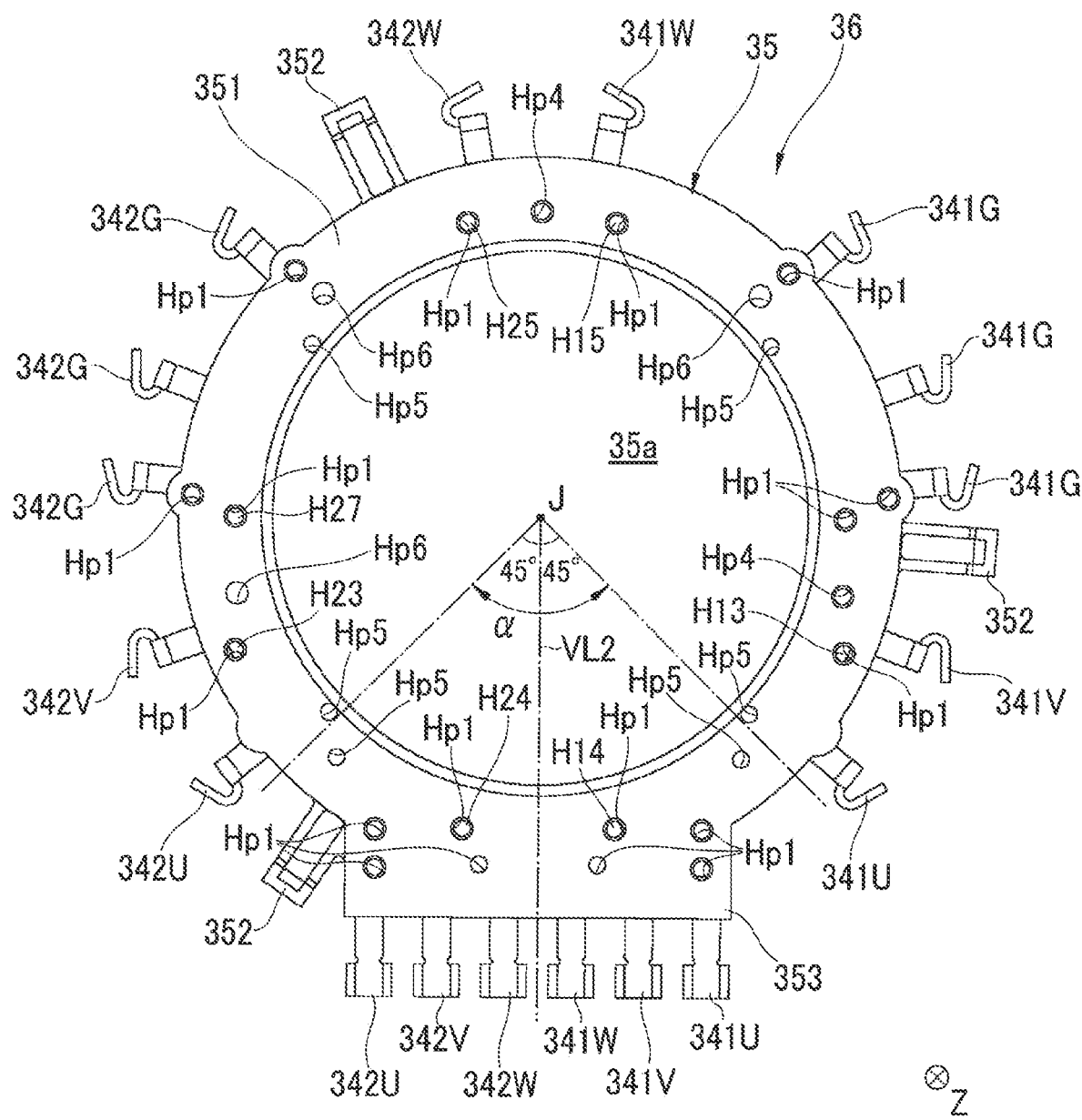
FIG. 4 is a plan view of the bus bar assembly as viewed from below.

As illustrated in FIGS. 2 to 4, the support leg portions 352 are disposed at three locations of the holder body 351. The three support leg portions 352 are disposed at intervals of 120° in the circumferential direction when viewed from the axial direction. The support leg portion 352 has an L shape that extends to the radial outside from the outer circumferential surface of the holder body 351 and is bent downward at an end portion on the radial outside. A lower end of the support leg portion 352 contacts the stator core 31 or the insulator 32. The support leg portion 352 positions the bus bar assembly 36 in the axial direction with respect to the stator core 31 or the insulator 32. The number of support leg portions 352 may be 2 or less or 4 or more. The bus bar holder 35 may be configured not to include the support leg portion 352.

The bus bar assembly 36 is configured to be connectable to three-phase coils of two systems. FIG. 3 schematically illustrates a coil configuration of the motor 1 of the present example embodiment. Six coils 33 are composed of two-system three-phase coils. That is, the motor 1 includes a first system coil group 331 including one set of U-phase coil 33U, V-phase coil 33V, and W-phase coil 33W, and a second system coil group 332 including another set of U-phase coil 33U, V-phase coil 33V, and W-phase coil 33W. The position and number of the coils 33 are not limited to the form illustrated in FIG. 3. For example, the U-phase coil 33U, the V-phase coil 33V, and the W-phase coil 33W may each include a plurality of coils.

As illustrated in FIG. 5, the bus bar group 34 includes a first system bus bar group 341 and a second system bus bar group 342. The first system bus bar group 341 includes a first U-phase bus bar 341U, a first V-phase bus bar 341V, a first W-phase bus bar 341W, and a first neutral point bus bar 341G. The second system bus bar group 342 includes a second U-phase bus bar 342U, a second V-phase bus bar 342V, a second W-phase bus bar 342W, and a second neutral point bus bar 342G.

That is, the bus bar assembly 36 includes a plurality of U-phase bus bars, a plurality of V-phase bus bars, and a plurality of W-phase bus bars. More specifically, the bus bar group 34 includes the first U-phase bus bar 341U and the second U-phase bus bar 342U constituting the U-phase bus bar group, the first V-phase bus bar 341V and the second V-phase bus bar 342V constituting the V-phase bus bar group, and the first W-phase bus bar 341W and the second W-phase bus bar 342W constituting the W-phase bus bar group.

Three coils of the first system coil group 331 illustrated in FIG. 3 are connected to the first system bus bar group 341. The U-phase coil 33U of the first system coil group 331 is connected to the first U-phase bus bar 341U and the first neutral point bus bar 341G. The V-phase coil 33V of the first system coil group 331 is connected to the first V-phase bus bar 341V and the first neutral point bus bar 341G. The W-phase coil 33W of the first system coil group 331 is connected to the first W-phase bus bar 341W and the first neutral point bus bar 341G.

The three coils of the second system coil group 332 are connected to the second system bus bar group 342. The U-phase coil 33U of the second system coil group 332 is connected to the second U-phase bus bar 342U and the second neutral point bus bar 342G. The V-phase coil 33V of the second system coil group 332 is connected to the second V-phase bus bar 342V and the second neutral point bus bar 342G. The W-phase coil 33W of the second system coil group 332 is connected to the second W-phase bus bar 342W and the second neutral point bus bar 342G.

As illustrated in FIG. 5, the first U-phase bus bar 341U includes a main line portion 41U extending in a plane orthogonal to the center axis J in a posture in which a plate surface is oriented in the axial direction, a connection terminal portion Tc for coil connection located at an end portion on one side of the main line portion 41U, and a connection terminal portion Te for external power source connection located at an end portion on the other side of the main line portion 41U. The main line portion 41U has the plate surface facing the axial direction and a side surface facing a direction orthogonal to the axial direction. The main line portion 41U includes a bus bar body portion 1aU extending in an arc shape along the circumferential direction around the center axis J, a coil wiring portion 1bU linearly extending from one end portion of the bus bar body portion 1aU to an outer peripheral side of the bus bar assembly 36, and an external power source wiring portion 1cU linearly extending from the other end portion of the bus bar body portion 1aU to the outer peripheral side of the bus bar assembly 36.

Similarly to the first U-phase bus bar 341U, the second U-phase bus bar 342U includes a main line portion 42U, a connection terminal portion Tc for coil connection, and a connection terminal portion Te for external power source connection. The main line portion 42U has a plate surface facing the axial direction and a side surface facing the direction orthogonal to the axial direction. The main line portion 42U includes a bus bar body portion 2aU extending in an arc shape along the circumferential direction around the center axis J, a coil wiring portion 2bU linearly extending from one end portion of the bus bar body portion 2aU to the outer peripheral side of the bus bar assembly 36, and an external power source wiring portion 2cU linearly extending from the other end portion of the bus bar body portion 2aU to the outer peripheral side of the bus bar assembly 36.

The first V-phase bus bar 341V includes a main line portion 41V extending in a plane orthogonal to the center axis J in a posture in which a plate surface is oriented in the axial direction, a connection terminal portion Tc for coil connection located at an end portion on one side of the main line portion 41V, and a connection terminal portion Te for external power source connection located at an end portion on the other side of the main line portion 41V. The main line portion 41V has the plate surface facing the axial direction and a side surface facing the direction orthogonal to the axial direction. The main line portion 41V includes a bus bar body portion 1aV extending in an arc shape along the circumferential direction around the center axis J, a coil wiring portion 1bV linearly extending from one end portion of the bus bar body portion lay to the outer peripheral side of the bus bar assembly 36, and an external power source wiring portion 1cV linearly extending from the other end portion of the bus bar body portion lay to the outer peripheral side of the bus bar assembly 36.

Similarly to the first V-phase bus bar 341V, the second V-phase bus bar 342V includes a main line portion 42V, a connection terminal portion Tc for coil connection, and a connection terminal portion Te for external power source connection. The main line portion 42V has a plate surface facing the axial direction and a side surface facing the direction orthogonal to the axial direction. The main line portion 42V includes a bus bar body portion 2aV extending in an arc shape along the circumferential direction around the center axis J, a coil wiring portion 2bV linearly extending from one end portion of the bus bar body portion 2aV to the outer peripheral side of the bus bar assembly 36, and an external power source wiring portion 2cV linearly extending from the other end portion of the bus bar body portion 2aV to the outer peripheral side of the bus bar assembly 36.

The first W-phase bus bar 341W includes a main line portion 41W extending in a plane orthogonal to the center axis J in a posture in which a plate surface is oriented in the axial direction, a connection terminal portion Tc for coil connection located at an end portion on one side of the main line portion 41W, and a connection terminal portion Te for external power source connection located at an end portion on the other side of the main line portion 41W. The main line portion 41W has the plate surface facing the axial direction and a side surface facing the direction orthogonal to the axial direction. The main line portion 41W includes a bus bar body portion 1aW extending in an arc shape along the circumferential direction around the center axis J, a coil wiring portion 1bW linearly extending from one end portion of the bus bar body portion 1aW to the outer peripheral side of the bus bar assembly 36, and an external power source wiring portion 1cW linearly extending from the other end portion of the bus bar body portion 1aW to the outer peripheral side of the bus bar assembly 36.

Similarly to the first W-phase bus bar 341W, the second W-phase bus bar 342W includes a main line portion 42W, a connection terminal portion Tc for coil connection, and a connection terminal portion Te for external power source connection. The main line portion 42W has a plate surface facing the axial direction and a side surface facing the direction orthogonal to the axial direction. The main line portion 42W includes a bus bar body portion 2aW extending in an arc shape along the circumferential direction around the center axis J, a coil wiring portion 2bW linearly extending from one end portion of the bus bar body portion 2aW to the outer peripheral side of the bus bar assembly 36, and an external power source wiring portion 2cW linearly extending from the other end portion of the bus bar body portion 2aW to the outer peripheral side of the bus bar assembly 36.

The first neutral point bus bar 341G includes a main line portion 41G extending in a plane orthogonal to the center axis J in a posture in which a plate surface is oriented in the axial direction, and three connection terminal portions Tc for coil connection located at end portions on one side and the other side of the main line portion 41G and a circumferential center of the main line portion 41G. The main line portion 41G has the plate surface facing the axial direction and a side surface facing the direction orthogonal to the axial direction. The main line portion 41G includes a bus bar body portion 1aG extending in an arc shape along the circumferential direction around the center axis J, and three coil wiring portions 1bG linearly extending from one and the other end portions of the bus bar body portion 1aG and a circumferential center toward the outer peripheral side of the bus bar assembly 36.

Similarly to the first neutral point bus bar 341G, the second neutral point bus bar 342G has a main line portion 42G and three connection terminal portions Tc for coil connection. The main line portion 42G has a plate surface facing the axial direction and a side surface facing the direction orthogonal to the axial direction. The main line portion 42G includes a bus bar body portion 2aG extending in an arc shape along the circumferential direction around the center axis J, and three coil wiring portions 2bG linearly extending from one and the other end portions of the bus bar body portion 2aG and a circumferential center toward the outer peripheral side of the bus bar assembly 36.

The bus bar assembly 36 may be configured not to include the first neutral point bus bar 341G and the second neutral point bus bar 342G. By using the first neutral point bus bar 341G and the second neutral point bus bar 342G, the wiring structure of the connecting wire for connecting the coils 33 to each other can be easily simplified, which is advantageous for improving productivity.

As illustrated in FIG. 5, the plurality of bus bars constituting the bus bar group 34 are disposed along the circumferential direction centered on the center axis J. Among the plurality of bus bars, the first W-phase bus bar 341W and the second W-phase bus bar 342W are located on the innermost side in the radial direction.

The first V-phase bus bar 341V and the first neutral point bus bar 341G are disposed radially outside the first W-phase bus bar 341W. The first U-phase bus bar 341U is disposed radially outside the first V-phase bus bar 341V.

The second V-phase bus bar 342V and the second neutral point bus bar 342G are disposed radially outside the second W-phase bus bar 342W. The second U-phase bus bar 342U is disposed radially outside the second V-phase bus bar 342V.

As illustrated in FIG. 5, the first system bus bar group 341 and the second system bus bar group 342 are disposed in two regions adjacent to each other with a first virtual line VL1 passing through the center axis J as a boundary when viewed in the axial direction. Furthermore, in the present example embodiment, the first U-phase bus bar 341U and the second U-phase bus bar 342U have a shape line-symmetric with the first virtual line VL1 as a symmetry axis, and are disposed at positions line-symmetric with the first virtual line VL1 as a symmetry axis. Similarly, the first V-phase bus bar 341V and the second V-phase bus bar 342V have a shape line-symmetric to each other with the first virtual line VL1 as a symmetry axis, and are disposed at line-symmetric positions. The first W-phase bus bar 341W and the second W-phase bus bar 342W have a shape line-symmetric to each other with the first virtual line VL1 as a symmetry axis, and are disposed at line-symmetric positions. The first neutral point bus bar 341G and the second neutral point bus bar 342G have a shape line-symmetric to each other with the first virtual line VL1 as a symmetry axis, and are disposed at line-symmetric positions.

The bus bar is manufactured by bending a blank obtained by punching a metal plate with a mold. In the present example embodiment, since the two bus bars disposed at symmetrical positions across the first virtual line VL1 have a shape line-symmetrical to each other, the two bus bars can be manufactured using a common blank. That is, the first U-phase bus bar 341U and the second U-phase bus bar 342U can be manufactured from a common blank. Similarly, the first V-phase bus bar 341V and the second V-phase bus bar 342V, the first W-phase bus bar 341W and the second W-phase bus bar 342W, and the first neutral point bus bar 341G and the second neutral point bus bar 342G can also be manufactured using a common blank.

According to the present example embodiment, the eight bus bars constituting the bus bar assembly 36 can be manufactured from four types of blanks. Therefore, the number of molds used for manufacturing the bus bar can be reduced, and the bus bar can be efficiently manufactured at low cost. The productivity of the bus bar assembly 36 can be improved.

In addition, in the present example embodiment, the bus bars having shapes line-symmetric to each other are disposed at line-symmetric positions with the first virtual line VL1 as a symmetry axis. According to this configuration, the first system bus bar group 341 and the second system bus bar group 342 are disposed at line-symmetric positions with the first virtual line VL1 as a symmetry axis. The bus bar holder 35 holding the bus bar group 34 can be easily formed into an annular shape close to a perfect circle, and can be easily disposed on the upper side of the annular stator core 31.

In the present example embodiment, both the shape and the arrangement of the pair of bus bars are line-symmetric with the first virtual line VL1 as a symmetry axis, but the present disclosure is not limited to this configuration. In the first U-phase bus bar 341U and the second U-phase bus bar 342U, the main line portion 41U and the main line portion 42U may have a shape line-symmetrical to each other with respect to the first virtual line VL1. The same applies to the first V-phase bus bar 341V and the second V-phase bus bar 342V, the first W-phase bus bar 341W and the second W-phase bus bar 342W, and the first neutral point bus bar 341G and the second neutral point bus bar 342G. When the main line portions have a line-symmetric shape, the blanks used for manufacturing the bus bars can be made common, and the manufacturing efficiency of the bus bars can be enhanced.

The shapes of the connection terminal portions Tc and Te, which are portions other than the main line portion, are changed according to a position and direction of a lead wire extending from the coil 33. For example, the first U-phase bus bar 341U and the second U-phase bus bar 342U may have different orientations of an opening of the connection terminal portion Tc for coil connection that grips the lead wire from the coil 33.

Even in this case, two blanks having different shapes only at portions where the connection terminal portions Tc and Te are formed can be manufactured only by sharing a punched shape from the metal plate and performing some cutting after the punching. Therefore, the number of molds for manufacturing a blank can be reduced.

In the present example embodiment, as illustrated in FIG. 5, the first U-phase bus bar 341U, the second U-phase bus bar 342U, the first V-phase bus bar 341V, the second V-phase bus bar 342V, the first W-phase bus bar 341W, the second W-phase bus bar 342W, the first neutral point bus bar 341G, and the second neutral point bus bar 342G are disposed at positions not overlapping each other when viewed from the axial direction. The eight bus bars are disposed at positions overlapping at least one other bus bar when viewed from the radial direction. In the case of the present example embodiment, the main line portions of the eight bus bars are disposed on a common plane in a posture in which the plate surfaces are oriented in the axial direction.

According to this configuration, the plurality of bus bars can be disposed at positions where the plurality of bus bars overlap each other when viewed from the radial direction, and the plurality of bus bars are disposed in a posture in which the plate surfaces are oriented in the axial direction, so that the thickness of the bus bar assembly 36 in the axial direction can be greatly reduced. By using the bus bar assembly 36 of the present example embodiment, it is possible to realize the stator 30 and the motor 1 which are compact in the axial direction.

As illustrated in FIG. 5, each of the bus bars constituting the bus bar group 34 has a widened portion protruding in a direction orthogonal to the axial direction from a side surface of the bus bar when viewed from the axial direction.

The first U-phase bus bar 341U has a widened portion $1d$U protruding from a side surface of the external power source wiring portion $1c$U to the external power source wiring portion $1c$V side (right side in FIG. 5) at the intersection of the bus bar body portion $1a$U and the external power source wiring portion $1c$U. The second U-phase bus bar 342U has a widened portion $2d$U protruding from a side surface of the external power source wiring portion $2c$U to the external power source wiring portion $2c$V side (left side in FIG. 5) at the intersection of the bus bar body portion $2a$U and the external power source wiring portion $2c$U.

The first U-phase bus bar 341U has two bus bar through holes H11 and H12 penetrating the main line portion 41U in the plate thickness direction (axial direction) at positions of the widened portion $1d$U. The second U-phase bus bar 342U has two bus bar through holes H21 and H22 penetrating the main line portion 42U in the plate thickness direction at positions of the widened portion $2d$U. The two bus bar through holes H11 and H12 of the first U-phase bus bar 341U are arranged along a direction in which the external power source wiring portion $1c$U extends. The two bus bar through holes H21 and 22 of the second U-phase bus bar 342U are arranged along a direction in which the external power source wiring portion $2c$U extends. The bus bar through holes H11 and H12 are holes into which support pins for fixing the respective bus bars in a mold are inserted when the bus bar group 34 is insert-molded in the bus bar holder 35. The same applies to other bus bar through holes H13 to H19 and bus bar through holes H23 to H29 described later.

The first V-phase bus bar 341V has a widened portion 1dV at a corner on an inner corner side at a position where the bus bar body portion 1aV and the coil wiring portion 1bV intersect. The first V-phase bus bar 341V has a widened portion 1eV protruding from a side surface of the external power source wiring portion 1cV to the external power source wiring portion 1cW side (right side in FIG. 5) at the intersection of the bus bar body portion 1aV and the external power source wiring portion 1cV. The first V-phase bus bar 341V has two bus bar through holes H13 and H14 penetrating the widened portions 1dV and 1 eV in the plate thickness direction, respectively.

The second V-phase bus bar 342V has a widened portion 2dV at a corner on an inner corner side at a position where the bus bar body portion 2aV and the coil wiring portion 2bV intersect. The second V-phase bus bar 342V has a widened portion 2eV protruding from a side surface of the external power source wiring portion 2cV to the external power source wiring portion 2cW side (left side in FIG. 5) at the intersection of the bus bar body portion 2aV and the external power source wiring portion 2cV. The second V-phase bus bar 342V has two bus bar through holes H23 and H24 penetrating the widened portions 2dV and 2 eV in the plate thickness direction, respectively.

The first W-phase bus bar 341W has a widened portion 1dW at a corner on an inner corner side at a position where the bus bar body portion 1aW and the coil wiring portion 1bW intersect. The first W-phase bus bar 341W has a widened portion 1eW protruding from a side surface of the external power source wiring portion 1cW toward the external power source wiring portion 1cV side (left side in FIG. 5) at the intersection of the bus bar body portion 1aW and the external power source wiring portion 1cW. The first W-phase bus bar 341W has a widened portion 1fW protruding to the radial outside from a side surface of the bus bar body portion 1aW at a central portion of the bus bar body portion 1aW. The first W-phase bus bar 341W has three bus bar through holes H15, H16, and H17 penetrating the widened portions 1dW, 1eW, and 1fW in the plate thickness direction, respectively.

The second W-phase bus bar 342W has a widened portion 2dW at a corner on an inner corner side at a position where the bus bar body portion 2aW and the coil wiring portion 2bW intersect. The second W-phase bus bar 342W has a widened portion 2eW protruding from a side surface of the external power source wiring portion 2cW toward the external power source wiring portion 2cV (right side in FIG. 5) at the intersection of the bus bar body portion 2aW and the external power source wiring portion 2cW. The second W-phase bus bar 342W has a widened portion 2fW protruding to the radial outside from a side surface of the bus bar body portion 2aW at a central portion of the bus bar body portion 2aW. The second W-phase bus bar 342W has three bus bar through holes H25, H26, and H27 penetrating the widened portions 2dW, 2eW, and 2fW in the plate thickness direction, respectively.

The first neutral point bus bar 341G has a widened portion 1dG protruding outward in the circumferential direction from a corner where the bus bar body portion 1aG and the coil wiring portion 1bG on one circumferential direction side are connected. The first neutral point bus bar 341G has a widened portion 1eG protruding outward in the circumferential direction from a corner where the bus bar body portion 1aG and the coil wiring portion 1bG on the other circumferential direction side are connected. The first neutral point bus bar 341G has two bus bar through holes H18 and H19 penetrating the widened portions 1dG and 1eG in the plate thickness direction, respectively.

The second neutral point bus bar 342G has a widened portion 2dG protruding outward in the circumferential direction from a corner where the bus bar body portion 2aG and the coil wiring portion 2bG on one circumferential direction side are connected. The second neutral point bus bar 342G has a widened portion 2eG protruding outward in the circumferential direction from a corner where the bus bar body portion 2aG and the coil wiring portion 2bG on the other circumferential direction side are connected. The second neutral point bus bar 342G has two bus bar through holes H28 and H29 penetrating the widened portions 2dG and 2eG in the plate thickness direction, respectively.

According to the present example embodiment, since each of the bus bars belonging to the bus bar group 34 has the widened portion protruding in the direction orthogonal to the axial direction from the side surface of each of the bus bars when viewed from the axial direction, it is possible to suppress an increase in electric resistance of the bus bar even when the bus bar through hole is provided in the bus bar. In the present example embodiment, the through hole of the bus bar may be located in the widened portion of the bus bar like the bus bar through holes H13 to H19 and H23 to H29 illustrated in FIG. 5, or may be located in the vicinity of the widened portions 1dU and 2dU like the bus bar through holes H11, H12, H21, and H22. With the configuration in which the bus bar through hole is located in the widened portion, an increase in electric resistance of the bus bar due to the through hole is substantially eliminated, so that the through hole for inserting the support pin can be disposed at an arbitrary position.

In the present example embodiment, the widened portion 1dV of the first V-phase bus bar 341V and the widened portion 2dV of the second V-phase bus bar 342V, and the widened portion 1dW of the first W-phase bus bar 341W and the widened portion 2dW of the second W-phase bus bar 342W are located inside the corner where each bus bar is bent. According to this configuration, rigidity of each bus bar can be enhanced. The bending of the bus bar can be reduced, and the effect of improving the yield of the bus bar assembly 36 and reducing the defect of the coil wiring can be obtained.

In the present example embodiment, the widened portions 1dV and 1eV of the first V-phase bus bar 341V and the widened portions 2dV and 2 eV of the second V-phase bus bar 342V are located at both circumferential ends of the first V-phase bus bar 341V and the second V-phase bus bar 342V, respectively. Similarly, the widened portions 1dW and 1eW of the first W-phase bus bar 341W and the widened portions 2dW and 2eW of the second W-phase bus bar 342W are located at both circumferential ends of the first W-phase bus bar 341W and the second W-phase bus bar 342W, respectively.

According to these configurations, by providing the bus bar through hole in the widened portion, the bus bar through hole for inserting the support pin can be disposed at both ends of the elongated bus bar, so that even a relatively long bus bar can be stably held. The positional accuracy of the bus bar at the time of insert molding can be enhanced. The yield of the bus bar assembly 36 can be improved, and the defect of the coil wiring can also be reduced.

In the present example embodiment, the first U-phase bus bar 341U, the second U-phase bus bar 342U, the first V-phase bus bar 341V, the second V-phase bus bar 342V, the first W-phase bus bar 341W, and the second W-phase bus bar 342W have the external power source wiring portions 1cU, 2cU, 1cV, 2cV, 1cW, and 2cW extending in a direction along the first virtual line VL1 in a part of each of the main line portions 41U, 42U, 41V, 42V, 41W, and 42W. The connection terminal portions Te for external power source extend from distal ends of the external power source wiring portions 1cU, 2cU, 1cV, 2cV, 1cW, and 2cW. The plurality of external power source wiring portions 1cU, 2cU, 1cV, 2cV, 1cW, and 2cW are arranged in a direction orthogonal to the first virtual line VL1 when viewed in the axial direction. The external power source wiring portions 1cU, 2cU, 1cV, 2cV, 1cW, and 2cW are held by the connector portion 353 of the bus bar holder 35 illustrated in FIGS. 2 to 4. The distal end portions of the external power source wiring portions 1cU, 2cU, 1cV, 2cV, 1cW, and 2cW protrude from the connector portion 353 to the outer peripheral side of the bus bar assembly 36.

According to this configuration, since the plurality of external power source wiring portions 1cU, 2cU, 1cV, 2cV, 1cW, and 2cW are accommodated in a partial region in the circumferential direction of the bus bar holder 35, the external power source wiring portions can be disposed compactly. Since the plurality of external power source wiring portions are arranged along the first virtual line VL1, both the external power source wiring portions 1cU, 1cV, and 1cW of the first system bus bar group 341 and the external power source wiring portions 2cU, 2cV, and 2cW of the second system bus bar group 342 can be disposed in the vicinity of the first virtual line VL1. A connector to the external power source of two systems can be made compact.

As illustrated in FIG. 5, the external power source wiring portions 1cV and 1cW of the first system have the widened portions 1eV and 1eW protruding from the side surfaces facing each other, and the two widened portions 1eV and 1eW overlap each other when viewed from a direction in which the external power source wiring portions 1cV and 1cW extend.

Also in the second system, the external power source wiring portions 2cV and 2cW have the widened portions 2eV and 2eW protruding from the side surfaces facing each other, and the two widened portions 2eV and 2eW overlap each other when viewed from a direction in which the external power source wiring portions 2cV and 2cW extend.

According to these configurations, the two widened portions 1eV and 1eW are disposed in a gap between the external power source wiring portions 1cV and 1cW disposed adjacent to each other. Two widened portions 2eV and 2eW are disposed in a gap between the external power source wiring portions 2cV and 2cW. Since the widened portions 1eV, 1eW, 2eV, and 2eW can be efficiently disposed, the connector to the external power source can be made compact. In addition, since the width between the external power source wiring portions is not excessively increased, it is possible to suppress the occurrence of a resin molding defect in the gap between the external power source wiring portions.

In the present example embodiment, the widened portion 1dU of the first U-phase bus bar 341U is disposed between the adjacent external power source wiring portions 1cU and 1cV. The widened portion 2dU of the second U-phase bus bar 342U is disposed between the adjacent external power source wiring portions 2cU and 2cV. According to this configuration, it is possible to prevent a gap between the adjacent external power source wiring portions 1cU and 1cV and a gap between the adjacent external power source wiring portions 2cU and 2cV from becoming excessively large, and to suppress the occurrence of resin molding defects in the gap between the external power source wiring portions.

The bus bar assembly 36 has a shield 37 overlapping with the bus bar group 34 when viewed from the axial direction. The shield 37 is an annular metal thin plate when viewed from the axial direction. The shield 37 is located on the upper side (+Z side) of the bus bar group 34. That is, the shield 37 is located between the bus bar group 34 and the resolver stator 62 in the axial direction. The shield 37 shields magnetism generated by the bus bar group 34 with respect to the resolver stator 62 which is an electronic circuit unit of the rotation position detector 60.

Figure 6:
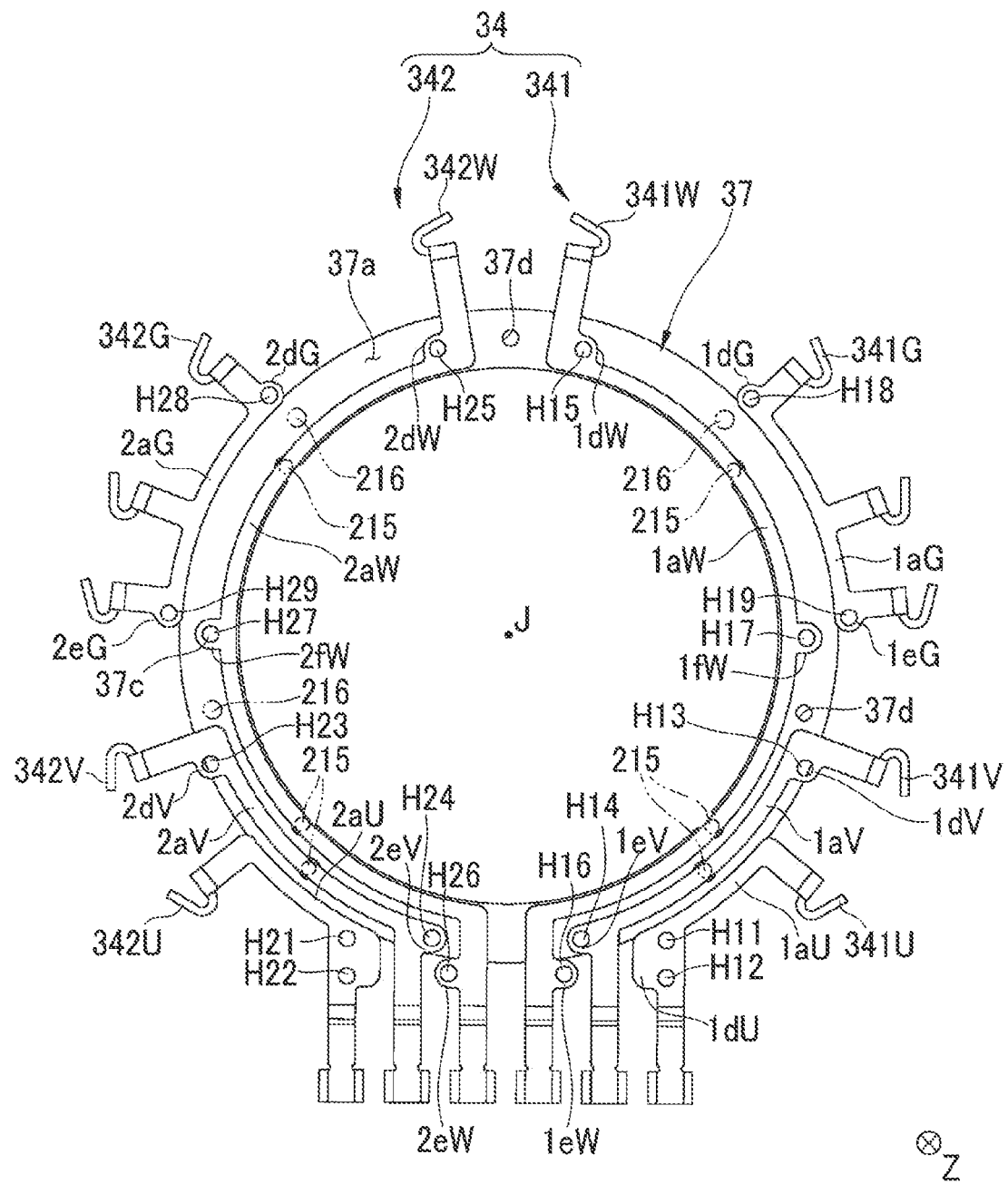
FIG. 6 is a plan view of the bus bar group and a shield as viewed from below.
Figure 7:
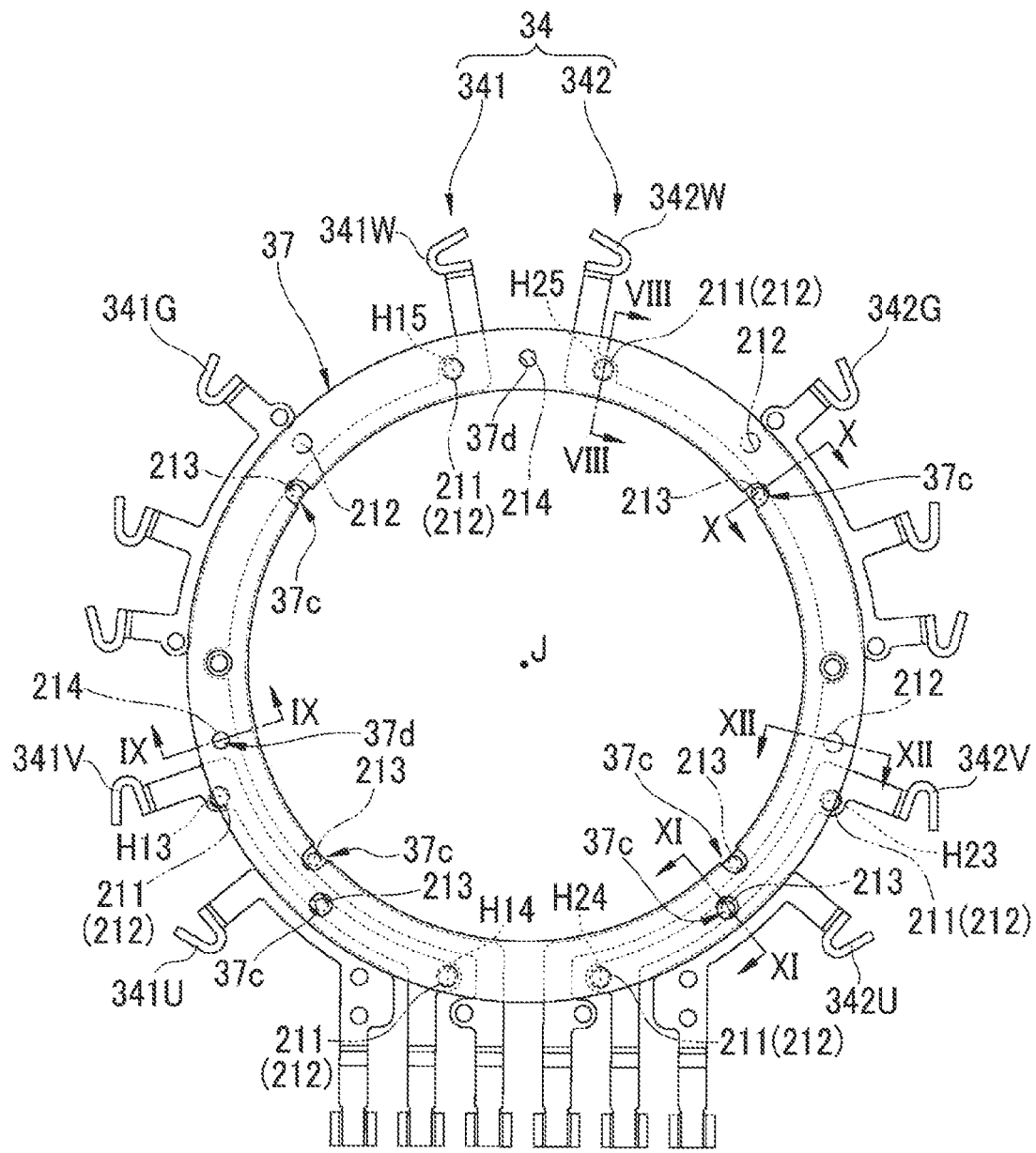
FIG. 7 is a plan view of the bus bar group and the shield as viewed from above.

As illustrated in FIGS. 6 and 7, when viewed from the axial direction, an inner peripheral edge of the shield 37 is located slightly radially inside an inner peripheral edge of the bus bar body portion 1aW of the first W-phase bus bar 341W and an inner peripheral edge of the bus bar body portion 2aW of the second W-phase bus bar 342W. An outer peripheral edge of the shield 37 substantially overlaps an inner peripheral edge of the bus bar body portion 1aU of the first U-phase bus bar 341U, an inner peripheral edge of the bus bar body portion 2aU of the second U-phase bus bar 342U, an inner peripheral edge of the bus bar body portion 1aG of the first neutral point bus bar 341G, and an inner peripheral edge of the bus bar body portion 2aG of the second neutral point bus bar 342G when viewed from the axial direction.

As illustrated in FIG. 7, the shield 37 covers the bus bar body portion 1aV of the first V-phase bus bar 341V, the bus bar body portion 2aV of the second V-phase bus bar 342V, the bus bar body portion 1aW of the first W-phase bus bar 341W, and the bus bar body portion 2aW of the second W-phase bus bar 342W from above. If necessary, the shield 37 can be sized to cover a part of the first U-phase bus bar 341U, the second U-phase bus bar 342U, the first neutral point bus bar 341G, and the second neutral point bus bar 342G.

FIGS. 8 to 12 are explanatory diagrams of a manufacturing process of the bus bar assembly 36. The sectional views of the bus bar and the shield illustrated in FIGS. 8 to 12 are sectional views taken along lines VIII-VIII, IX-IX, X-X, XI-XI, and XII-XII illustrated in FIG. 7, respectively, and the right side corresponds to the center axis J side.

The bus bar assembly 36 is manufactured by collectively insert molding the bus bar group 34 and the shield 37 in the bus bar holder 35. Most of the bus bar group 34 is embedded in the bus bar holder 35, and only the connection terminal portions Tc and Te located at the end portions and peripheral portions thereof are exposed from the bus bar holder 35. The shield 37 is substantially entirely embedded in the bus bar holder 35.

The manufacturing process of the bus bar assembly 36 includes a preparation step of preparing a mold 200 (see FIG. 8) for insert-molding the bus bar group 34 and the shield 37, a first step of positioning the bus bar group 34 and the shield 37 in the mold 200, and a second step of injecting resin into the mold 200 to mold the bus bar holder 35 after the first step.

Figure 8:
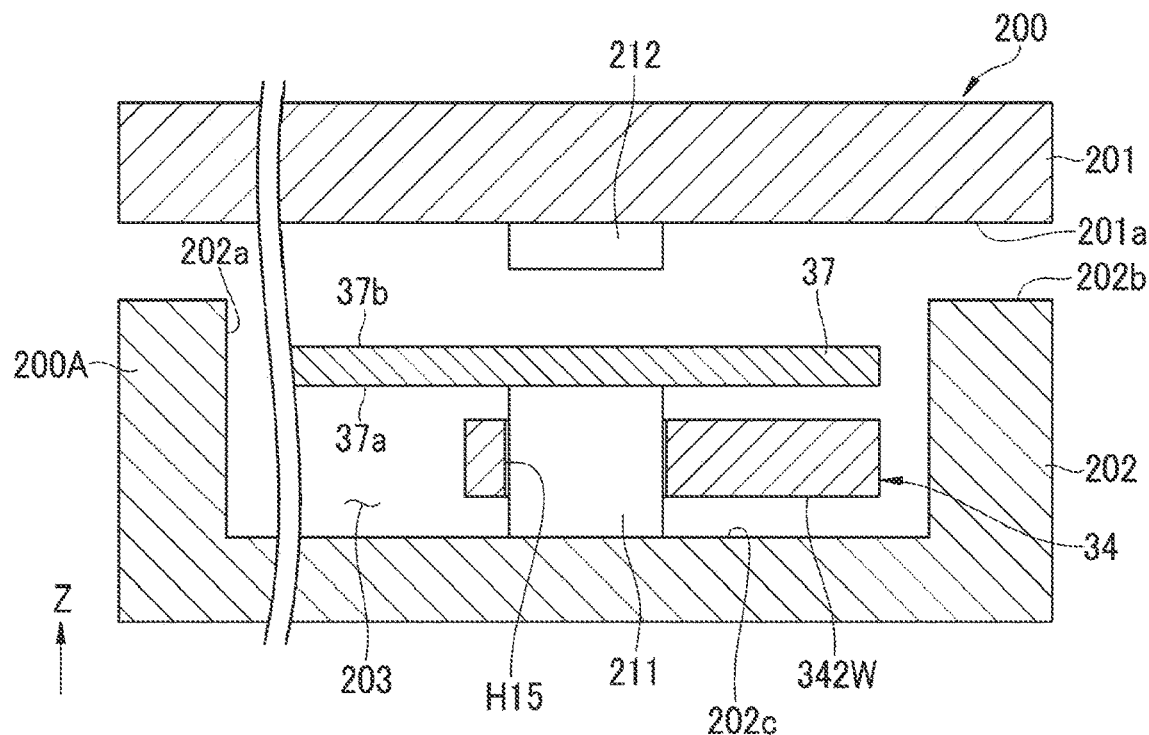
FIG. 8 is a sectional view of a mold illustrating a manufacturing process of the bus bar assembly.

As illustrated in FIG. 8, the mold 200 includes an upper mold 201 and a lower mold 202 disposed vertically. In the present example embodiment, the lower mold 202 has a recess 202a that opens upward. The upper mold 201 has a plate shape that covers an opening of the recess 202a from above. The mold 200 can seal the opening of the recess 202a by bringing a lower surface 201a of the upper mold 201 into contact with an upper end surface 202b of the lower mold 202. An internal space 203 of the mold 200 surrounded by the upper mold 201 and the lower mold 202 is filled with a resin material to be the bus bar holder 35.

In the first step, the bus bar group 34 and the shield 37 are disposed in the recess 202a of the lower mold 202. As illustrated in FIGS. 8 to 12, the bus bar group 34 is disposed on a bottom side of the recess 202a, and the shield 37 is disposed on the upper side of the bus bar group 34. The bus bar group 34 and the shield 37 are fixed at predetermined positions in the internal space 203 by a plurality of positioning pins extending upward from a bottom surface 202c of the lower mold 202 and a plurality of positioning pins extending downward from the lower surface 201a of the upper mold 201.

Figure 9:
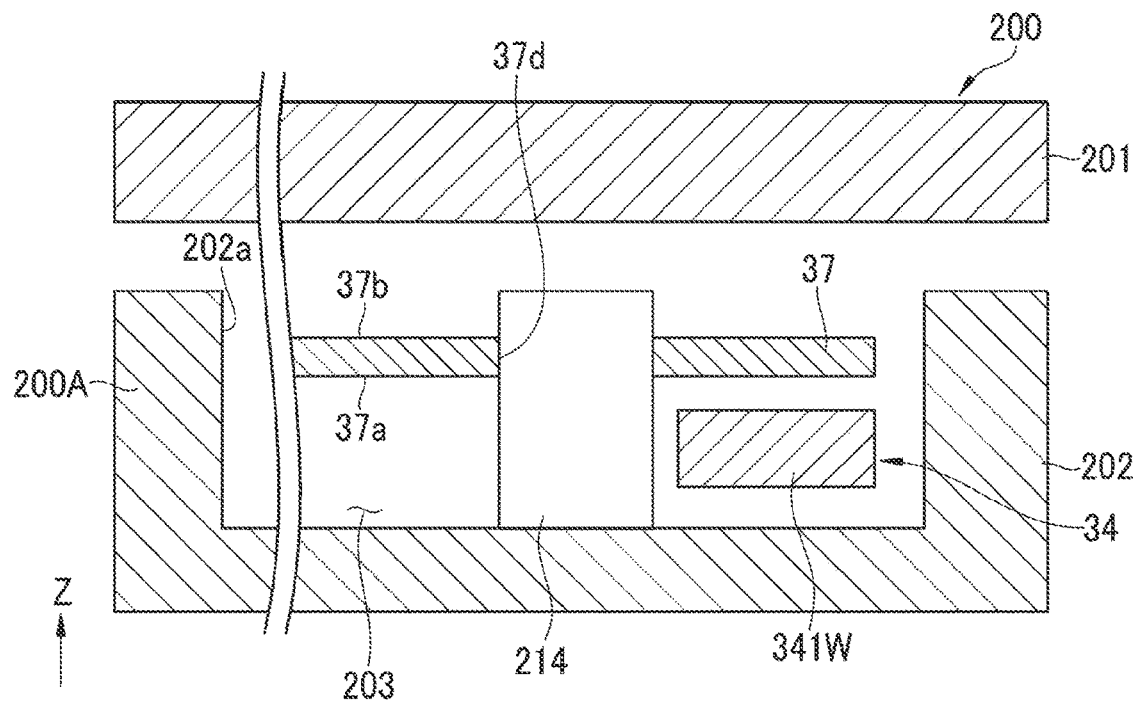
FIG. 9 is a sectional view of the mold illustrating the manufacturing process of the bus bar assembly.
Figure 10:
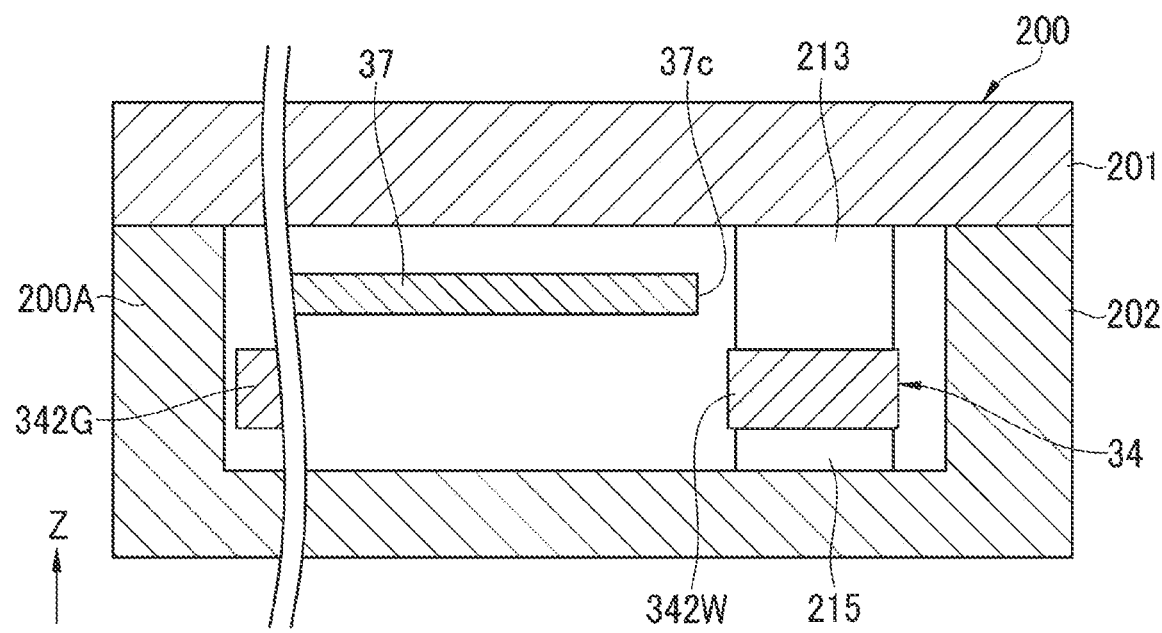
FIG. 10 is a sectional view of the mold illustrating the manufacturing process of the bus bar assembly.
Figure 12:
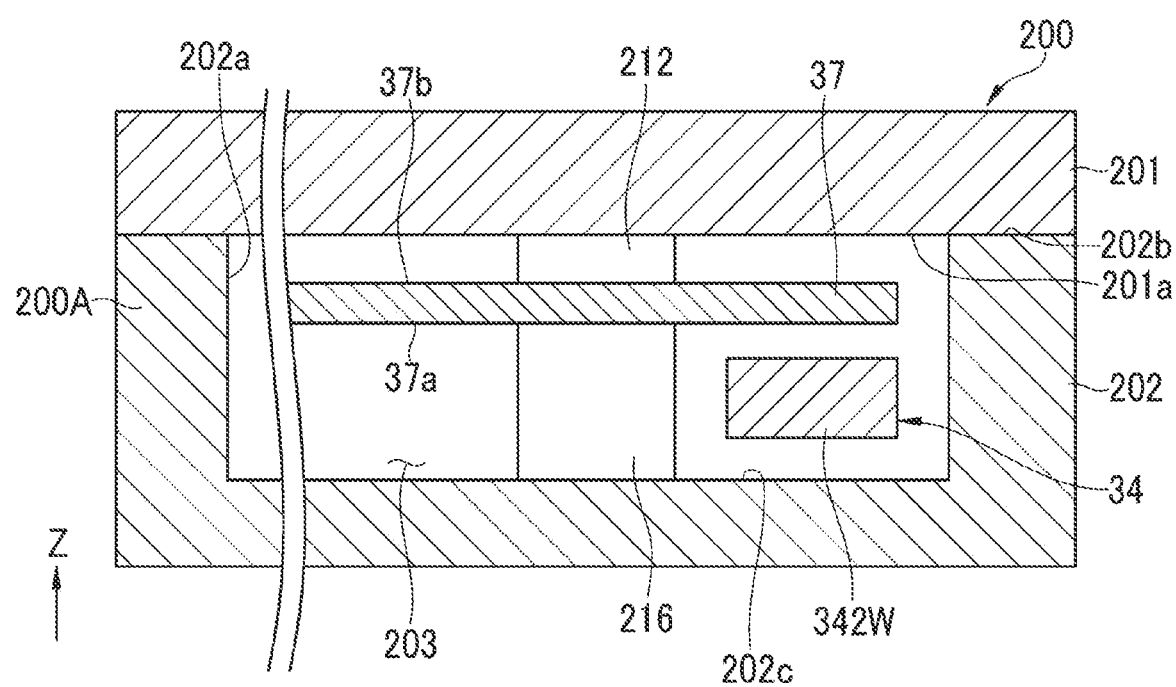
FIG. 12 is a sectional view of the mold illustrating the manufacturing process of the bus bar assembly.

The mold 200 includes a first positioning pin 211 extending upward from the bottom surface 202c of the lower mold 202 illustrated in FIG. 8, a second positioning pin 212 extending downward from the lower surface 201a of the upper mold 201, a third positioning pin 213 extending downward from the lower surface 201a of the upper mold 201 illustrated in FIG. 10, a fourth positioning pin 214 extending upward from the bottom surface 202c of the lower mold 202 illustrated in FIG. 9, a fifth positioning pin 215 extending upward from the bottom surface 202c of the lower mold 202 illustrated in FIG. 10, and a sixth positioning pin 216 extending upward from the bottom surface 202c of the lower mold 202 illustrated in FIG. 12.

The mold 200 includes a plurality of six types of positioning pins from the first positioning pin 211 to the sixth positioning pin 216.

The first positioning pin 211 is inserted into each of the bus bar through holes H11 to H19 and H21 to H29 of the bus bar group 34 installed in the recess 202a. The first positioning pin 211 has a columnar shape. The first positioning pin 211 passes through the bus bar through holes H11 to H19 and H21 to H29 from the lower side to the upper side. An upper end of the first positioning pin 211 protrudes upward from upper ends of the bus bar through holes H11 to H19 and H21 to H29.

Some of the bus bars in the bus bar group 34 are supported from below by the fifth positioning pins 215 illustrated in FIG. 10. The fifth positioning pin 215 has a columnar shape extending in the vertical direction. As illustrated in FIG. 6, the fifth positioning pin 215 supports lower surfaces of the first V-phase bus bar 341V, the first W-phase bus bar 341W, the second V-phase bus bar 342V, and the second W-phase bus bar 342W from below.

The fifth positioning pin 215 is disposed at a circumferential center of the arc-shaped bus bar body portions 1aV and 2aV in the V-phase bus bar.

The fifth positioning pin 215 is disposed at two locations of each of the arc-shaped bus bar body portions 1aW and 2aW in the W-phase bus bar. In the bus bar body portion 1aW, the fifth positioning pin 215 is disposed at an intermediate position between the widened portion 1dW and the widened portion 1fW and an intermediate position between the widened portion 1eW and the widened portion 1fW. In the bus bar body portion 2aW, the fifth positioning pin 215 is disposed at an intermediate position between the widened portion 2dW and the widened portion 2fW and an intermediate position between the widened portion 2eW and the widened portion 2fW.

The first positioning pin 211 is inserted into each of the bus bar through holes H11 to H19 and H21 to H29 of the eight bus bars, and two or more bus bar through holes are provided in each of the bus bars. With this configuration, each bus bar is positioned in a horizontal direction orthogonal to the vertical direction by the first positioning pin 211.

After the bus bar group 34 is installed in the recess 202a, the shield 37 is installed above the bus bar group 34. The shield 37 is supported by the first positioning pin 211 extending upward from the bottom surface of the lower mold 202, the fourth positioning pin 214, the sixth positioning pin 216, and the second positioning pin 212 extending downward from the upper surface of the upper mold 201.

As illustrated in FIG. 8, the first positioning pin 211 comes into contact with a lower surface 37a of the shield 37 from below. Specifically, the six first positioning pins 211 passing through the bus bar through holes H13 and H14 of the first V-phase bus bar 341V, the bus bar through hole H15 of the first W-phase bus bar 341W, the bus bar through holes H23 and H24 of the second V-phase bus bar 342V, and the bus bar through hole H25 of the second W-phase bus bar 342W illustrated in FIG. 7 support the shield 37 from below.

In the case of the present example embodiment, the six first positioning pins 211 supporting the shield 37 are disposed relatively dispersedly in the circumferential direction. Positions where the two first positioning pins 211 passing through the bus bar through holes H15 and H25 are disposed are located on an opposite side with the center axis J interposed therebetween when viewed from above with respect to positions where the two first positioning pins 211 passing through the bus bar through holes H14 and H24 are disposed. The two first positioning pins 211 passing through the bus bar through holes H13 and H23 are disposed at positions relatively distant from the four first positioning pins 211 passing through the bus bar through holes H15, H25, H14, and H24 in the circumferential direction. According to this configuration, since the first positioning pins 211 supporting the shield 37 from below are disposed at intervals without being biased in the circumferential direction, it is possible to suppress the shield 37 from being inclined or bent.

In the present example embodiment, the external power source wiring portions 1cU, 1cV, 1cW, 2cU, 2cV, and 2cW include the bus bar through holes H11, H12, H14, H16, H21, H22, H24, and H26. According to this configuration, at the time of manufacturing the bus bar assembly 36, the external power source wiring portions 1cU, 1cV, 1cW, 2cU, 2cV, and 2cW are fixed in the horizontal direction by the first positioning pins 211 inserted into the bus bar through holes H11, H12, H14, H16, H21, H22, H24, and H26, so that the positional accuracy of the external power source wiring portions 1cU, 1cV, 1cW, 2cU, 2cV, and 2cW serving as connection terminals to the external power source can be enhanced. It is possible to manufacture the bus bar assembly 36 in which a connection failure with an external power source hardly occurs.

In the present example embodiment, the bus bars constituting the bus bar group 34 may have the bus bar through holes in a range within ±45 degrees from a central position of the connector portion 353 where the plurality of external power source wiring portions 1cU, 1cV, 1cW, 2cU, 2cV, and 2cW are located in the circumferential direction around the center axis J. In the case of the present example embodiment, the center axis J coincides with a center axis of the inner hole 35a of the bus bar holder 35. FIG. 4 illustrates a second virtual line VL2 connecting the center axis J and the circumferential center position of the connector portion 353 and a range a of ±45° in the circumferential direction from the second virtual line VL2. When the bus bar through hole is disposed within the range a illustrated in FIG. 4, the first positioning pin 211 can provide an effect of increasing the positional accuracy of the plurality of external power source wiring portions 1cU, 1cV, 1cW, 2cU, 2cV, and 2cW.

At a position where the first positioning pin 211 supports the shield 37 from below, the shield 37 shields the bus bar through holes H13, H14, H15, H23, H24, and H25 when viewed from the vertical direction. That is, the shield 37 has a plurality of through hole shielding portions that individually overlap with the plurality of bus bar through holes H13, H14, H15, H23, H24, and H25 when viewed from the vertical direction. Among the plurality of through hole shielding portions in the shield 37, the through hole shielding portions that shield the bus bar through holes H14 and H24 are located in the external power source wiring portions 1cV and 2cV, and the through hole shielding portions that shield the other bus bar through holes H13, H15, H23, and H25 are located in the bus bar body portions 1aV, 1aW, 2aV, and 2aW or the coil wiring portions 1bV, 1bW, 2bV, and 2bW.

The fourth positioning pin 214 is inserted into a shield through hole 37d illustrated in FIGS. 6 and 7. The shield through hole 37d is a hole penetrating the shield 37 in the vertical direction. The shield through hole 37d is disposed at a position not overlapping with the bus bar group 34 when viewed from the vertical direction. The fourth positioning pin 214 has a columnar shape. As illustrated in FIG. 9, the fourth positioning pin 214 extends upward from the bottom surface 202c of the lower mold 202 and is inserted into the shield through hole 37d from the lower side. An upper end of the fourth positioning pin 214 protrudes upward from an upper surface of the shield 37. In the case of the present example embodiment, the shield 37 has two shield through holes 37d.

As illustrated in FIG. 6, the sixth positioning pins 216 are located at three positions on a lower surface of the shield 37. The sixth positioning pin 216 has a columnar shape. As illustrated in FIG. 12, the sixth positioning pin 216 extends upward from the bottom surface 202c of the lower mold 202 and contacts the lower surface 37a of the shield 37. The sixth positioning pin 216 supports the shield 37 together with the first positioning pin 211 from below. That is, the shield 37 is supported from below by a total of nine positioning pins. The sixth positioning pin 216 is disposed at a position where a circumferential interval of the six first positioning pins 211 supporting the shield 37 is wide. The sixth positioning pin 216 makes it easy to hold the shield 37 in a horizontal posture.

After the bus bar group 34 and the shield 37 are installed in the recess 202a, the upper mold 201 is moved downward and disposed at a closed position. The closed position is a position where the lower surface 201a of the upper mold 201 abuts against the upper end surface 202b of the lower mold 202. When the upper mold 201 is disposed at the closed position, the opening of the recess 202a is closed.

As illustrated in FIGS. 8 to 11, the upper mold 201 includes the second positioning pin 212 and the third positioning pin 213. The second positioning pin 212 and the third positioning pin 213 are columnar pins extending downward from the lower surface 201a of the upper mold 201.

As illustrated in FIGS. 8 and 12, the second positioning pin 212 is disposed at a position overlapping the first positioning pin 211 and the sixth positioning pin 216 that support the shield 37 from below when viewed from above. As illustrated in FIGS. 8 and 12, the second positioning pin 212 sandwiches the shield 37 between the second positioning pin and the first positioning pin 211 and between the second positioning pin and the sixth positioning pin 216, and fixes the shield in the vertical direction. Therefore, the step of disposing the upper mold 201 at the closed position is a step of bringing the second positioning pin 212 into contact with an upper surface 37b of the shield 37 and positioning the shield 37 in the vertical direction.

As illustrated in FIG. 7, the third positioning pin 213 is disposed at a position overlapping with the fifth positioning pin 215 (see FIG. 6) that supports the shield 37 from below when viewed from above. The third positioning pin 213 passes through a shield notch 37c cut out so as to vertically penetrate the shield 37. In the case of the present example embodiment, the shield notch 37c is a notch that opens radially inward. As illustrated in FIG. 10, the third positioning pin 213 sandwiches the bus bar between the third positioning pin and the fifth positioning pin 215 and fixes the bus bar in the vertical direction. Therefore, the step of disposing the upper mold 201 at the closed position is a step of bringing the third positioning pin 213 into contact with an upper surface of the bus bar and positioning the bus bar in the vertical direction.

Through the first step described above, the bus bar group 34 and the shield 37 are fixed in the internal space of the mold 200 in a state of being positioned. In the subsequent second step, resin is injected into the mold 200 to mold the bus bar holder 35. Through the above steps, the bus bar assembly 36 is manufactured.

According to the manufacturing method of the bus bar assembly 36 of the present example embodiment, the bus bar group 34 and the shield 37 can be positioned in the vertical direction and the horizontal direction by using the positioning pins provided in the upper mold 201 and the lower mold 202. It is possible to easily manufacture the bus bar assembly 36 in which the bus bar group 34 and the shield 37 are accurately positioned without using a dedicated component for positioning an insert component.

In the present example embodiment, the configuration in which both the bus bar group 34 and the shield 37 can be positioned in the vertical direction and the horizontal direction has been described, but a configuration in which the positioning mechanism of the shield 37 in the horizontal direction is not provided can be adopted. That is, the bus bar assembly 36 may be manufactured using the mold 200 not including the fourth positioning pin 214 that positions the shield 37 in the horizontal direction. If the shield 37 having a sufficient size as viewed from the vertical direction is used, magnetism generated by the bus bar group 34 can be shielded even if the position of the shield 37 in the horizontal direction is slightly shifted.

As illustrated in FIGS. 2 to 4, the bus bar assembly 36 obtained by the manufacturing method of the present example embodiment has the plurality of pin insertion holes opened in an upper surface or a lower surface of the bus bar holder 35.

As illustrated in FIG. 4, the bus bar holder 35 has a plurality of first pin insertion holes Hp1 that are open in the lower surface of the bus bar holder 35 and extend upward. The first pin insertion hole Hp1 is a hole formed by the first positioning pin 211 in the manufacturing process of the bus bar assembly 36. Therefore, the first pin insertion hole Hp1 is a hole that passes through the bus bar through hole and reaches the lower surface of the shield 37.

As illustrated in FIG. 3, the bus bar holder 35 has a plurality of second pin insertion holes Hp2 that are open in the upper surface of the bus bar holder 35 and extend downward. The second pin insertion hole Hp2 is a hole formed by the second positioning pin 212 in the manufacturing process of the bus bar assembly 36. The second positioning pin 212 is a pin that presses the shield 37 from above at a position overlapping the first positioning pin 211 and the sixth positioning pin 216 that support the shield 37 from below in the vertical direction. Therefore, the second pin insertion hole Hp2 is a hole extending downward from the upper surface of the bus bar holder 35 and reaching the upper surface 37b of the shield 37.

Figure 11:
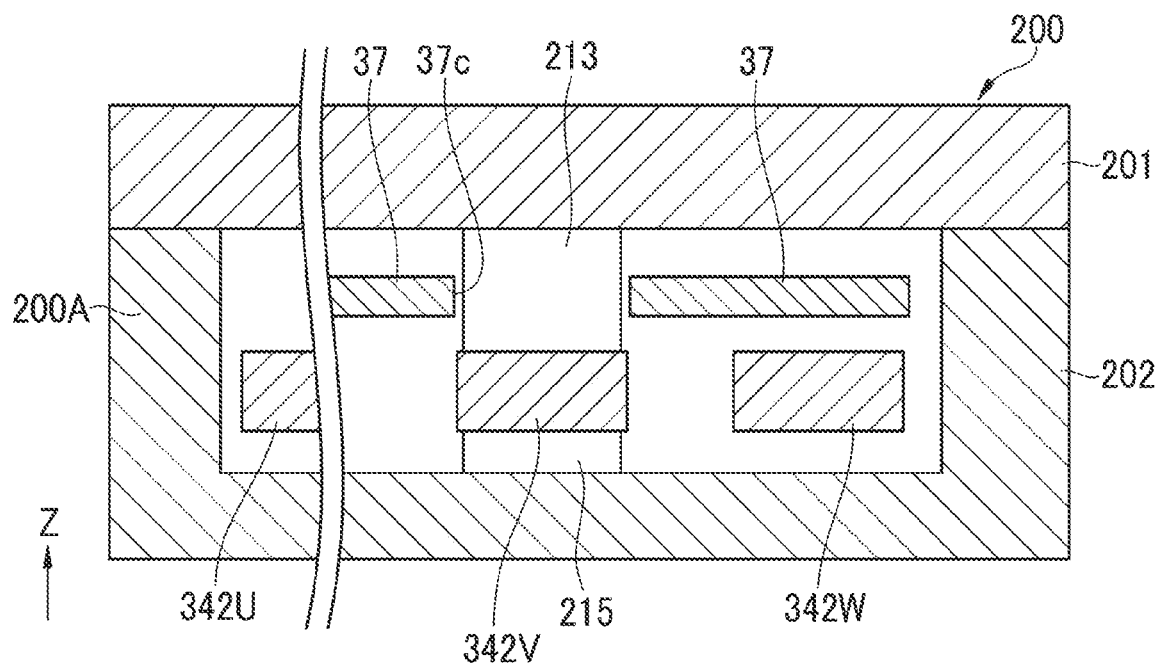
FIG. 11 is a sectional view of the mold illustrating the manufacturing process of the bus bar assembly.

As illustrated in FIG. 3, the bus bar holder 35 has a plurality of third pin insertion holes Hp3 that are open in the upper surface of the bus bar holder 35 and extend downward. The third pin insertion hole Hp3 is a hole formed by the third positioning pin 213 in the manufacturing process of the bus bar assembly 36. As illustrated in FIGS. 10 and 11, the third positioning pin 213 holds the bus bar while vertically sandwiching the bus bar between the third positioning pin and the fifth positioning pin 215 extending from the lower mold 202. Therefore, the third pin insertion hole Hp3 is a hole extending downward from the upper surface of the bus bar holder 35 and reaching the upper surface of the bus bar.

As illustrated in FIGS. 3 and 4, the bus bar holder 35 has a plurality of fourth pin insertion holes Hp4 that vertically penetrate the bus bar holder 35. The fourth pin insertion hole Hp4 is a hole formed by the fourth positioning pin 214 in the manufacturing process of the bus bar assembly 36. As illustrated in FIG. 9, the fourth positioning pin 214 extends upward from the lower mold 202, passes through the shield through hole 37d, and reaches the upper mold 201. Therefore, the fourth pin insertion hole Hp4 is a hole that extends upward from the lower surface of the bus bar holder 35, passes through the shield through hole 37d, and passes through to the upper surface of the bus bar holder 35. The fourth positioning pin 214 may have a length that does not reach the upper mold 201. In this case, the fourth pin insertion hole Hp4 opens only in the lower surface of the bus bar holder 35.

As illustrated in FIG. 4, the bus bar holder 35 has a plurality of fifth pin insertion holes Hp5 that are open in the lower surface of the bus bar holder 35 and extend upward. The fifth pin insertion hole Hp5 is a hole formed by the fifth positioning pin 215 in the manufacturing process of the bus bar assembly 36. As illustrated in FIGS. 10 and 11, the fifth positioning pin 215 holds the bus bar while vertically sandwiching the bus bar between the fifth positioning pin and the third positioning pin 213. Therefore, the fifth pin insertion hole Hp5 is a hole extending upward from the lower surface of the bus bar holder 35 and reaching a lower surface of the bus bar.

As illustrated in FIG. 4, the bus bar holder 35 has a plurality of sixth pin insertion holes Hp6 that are open in the lower surface of the bus bar holder 35 and extend upward. The sixth pin insertion hole Hp6 is a hole formed by the sixth positioning pin 216 in the manufacturing process of the bus bar assembly 36. As illustrated in FIG. 12, the sixth positioning pin 216 holds the bus bar by vertically sandwiching the bus bar between the sixth positioning pin and the second positioning pin 212. Therefore, the sixth pin insertion hole Hp6 is a hole extending upward from the lower surface of the bus bar holder 35 and reaching the lower surface 37a of the shield 37.

With the configuration including the plurality of types of pin insertion holes described above, it is possible to specify the bus bar assembly obtained by the manufacturing method of the present example embodiment. In the manufacturing process of the bus bar assembly 36, the fourth positioning pin 214, the fifth positioning pin 215, and the sixth positioning pin 216 are used as necessary. The bus bar assembly obtained by the manufacturing method not using any one or more of the fourth positioning pin 214, the fifth positioning pin 215, and the sixth positioning pin 216 is naturally configured not to include the pin insertion hole corresponding to the positioning pin not used.

Features of the above-described preferred example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A manufacturing method of a bus bar assembly to connect between a coil in a motor and an external power source;
   the bus bar assembly including a bus bar made of a conductor, a shield to shield magnetism generated by the bus bar, and a bus bar holder to hold the bus bar and the shield, the conductor and the shield each being plate-shaped;
   the bus bar including a bus bar body portion held by the bus bar holder in a posture in which a plate surface is directed in a vertical direction, and bus bar through holes penetrating the bus bar in a plate thickness direction, the bus bar body portion being arc-shaped; and
   the shield including a portion overlapping the bus bar through holes when viewed from the vertical direction;
   the method comprising:
   preparing a mold to insert-mold the bus bar and the shield;
   positioning the bus bar and the shield in the mold; and
   injecting a resin into the mold to mold the bus bar holder after the positioning; wherein the positioning includes:
   inserting first positioning pins extending upward from an upper surface of a lower mold of the mold into the bus bar through holes to cause the first positioning pins to hold the bus bar;
   arranging the shield in the mold in a state where a lower surface of the shield and a distal end of the first positioning pin are in contact with each other;
   bringing a second positioning pin extending downward from a lower surface of an upper mold of the mold into contact with an upper surface of the shield and positioning the shield in the vertical direction; and
   bringing a third positioning pin extending downward from the lower surface of the upper mold into contact with an upper surface of the bus bar to position the bus bar in the vertical direction.

2. The manufacturing method of the bus bar assembly according to claim 1, wherein
   the shield includes a shield through hole penetrating the shield in a plate thickness direction;
   the mold includes a fourth positioning pin extending upward from the upper surface of the lower mold or extending downward from the lower surface of the upper mold; and
   the positioning includes inserting the fourth positioning pin into the shield through hole.

3. The manufacturing method of the bus bar assembly according to claim 1, wherein
   the bus bar includes the bus bar through holes at each of two ends of the bus bar body portion.

4. The manufacturing method of the bus bar assembly according to claim 1, wherein
   the bus bar includes a coil wiring portion and an external power source wiring portion respectively extending from different end portions of the bus bar body portion;
   the external power source wiring portion extends linearly from the end portion of the bus bar body portion to an outer peripheral side when viewed from the vertical direction, and is provided along a width direction of the external power source wiring portion; and the bus bar includes a bus bar through hole penetrating the external power source wiring portion in a plate thickness direction.

5. The manufacturing method of the bus bar assembly according to claim 4, wherein the bus bar holder has an annular shape including an inner hole extending in the vertical direction; and the bus bar includes the bus bar through hole in a range within about ±45 degrees from a central position of a connector portion where a plurality of the external power source wiring portions are located in a circumferential direction around a center axis of the inner hole.

6. The manufacturing method of the bus bar assembly according to claim 1, wherein the bus bar includes a widened portion protruding in a width direction from a side surface of the bus bar.

7. The manufacturing method of the bus bar assembly according to claim 6, wherein the bus bar includes the bus bar through hole in the widened portion.

8. The manufacturing method of the bus bar assembly according to claim 6, wherein the bus bar includes the widened portion at a portion where the bus bar is bent.

9. A bus bar assembly applicable to connection between a coil in a motor and an external power source, the bus bar assembly comprising:

a bus bar made of a conductor, the conductor being plate-shaped;

a shield to shield magnetism generated by the bus bar, the shield being plate-shaped; and a bus bar holder to hold the bus bar and the shield; wherein the bus bar includes a bus bar body portion held by the bus bar holder in a posture in which a plate surface is directed in a vertical direction, and bus bar through holes penetrating the bus bar in a plate thickness direction, the bus bar body portion being arc-shaped;

the shield includes a portion overlapping the bus bar through holes when viewed from the vertical direction; and the bus bar holder includes:

first pin insertion holes that are open in a lower surface of the bus bar holder, extend upward, pass through the bus bar through holes, and reach a lower surface of the shield;

a second pin insertion hole that opens in an upper surface of the bus bar holder, extends downward, and reaches an upper surface of the shield; and a third pin insertion hole that opens in the upper surface of the bus bar holder, extends downward, and reaches the upper surface of the bus bar.

10. The bus bar assembly according to claim 9, wherein the bus bars include:

a first U-phase bus bar and a second U-phase bus bar defining a U-phase bus bar group;

a first V-phase bus bar and a second V-phase bus bar defining a V-phase bus bar group, and a first W-phase bus bar and a second W-phase bus bar defining a W-phase bus bar group.

11. The bus bar assembly according to claim 9, wherein the bus bar includes a coil wiring portion and an external power source wiring portion respectively extending from different end portions of the bus bar body portion;

the external power source wiring portion extends linearly from the end portion of the bus bar body portion to an outer peripheral side when viewed from the vertical direction, and is provided along a width direction of the external power source wiring portion;

the bus bar includes a widened portion protruding in a width direction from a side surface of the bus bar;

two external power source wiring portions which are adjacent to each other include the widened portions protruding from side surfaces opposing each other; and the two widened portions overlap each other when viewed from a direction in which the external power source wiring portion extends.

12. A motor comprising:

a rotor rotatable about a center axis extending in a vertical direction;

an annular stator located on a radial outside of the rotor; and a rotation position detector located above the stator to detect a rotation position of the rotor; wherein the stator includes a stator body including a coil and a stator core with the bus bar assembly according to claim 9 located between the stator core and the rotation position detector.

13. A motor comprising:

a rotor rotatable about a center axis extending in a vertical direction;

an annular stator located on a radial outside of the rotor; and a rotation position detector located above the stator to detect a rotation position of the rotor; wherein the stator includes a stator body including a coil and a stator core, and a bus bar assembly located between the stator core and the rotation position detector;

the bus bar assembly includes a bus bar made of a conductor, a shield to shield magnetism generated by the bus bar, and a bus bar holder to hold the bus bar and the shield, the conductor and the shield each being plate-shaped;

the bus bar includes a bus bar body portion held by the bus bar holder in a posture in which a plate surface is directed in the vertical direction, bus bar through holes penetrating the bus bar in a plate thickness direction, and a coil wiring portion and an external power source wiring portion respectively extending from different end portions of the bus bar body portion, the bus bar body portion being arc-shaped;

the shield includes through hole shielding portions that individually overlap the bus bar through holes when viewed from the vertical direction;

the external power source wiring portion extends linearly from the end portion of the bus bar body portion to an outer peripheral side when viewed from the vertical direction, and is provided along a width direction of the external power source wiring portion; and some of the through hole shielding portions are located in the external power source wiring portion, and others of the through hole shielding portions are located in the bus bar body portion or the coil wiring portion.

14. The motor according to claim 13, wherein the bus bar holder has an annular shape having an inner hole extending in the vertical direction; and the through hole shielding portion is located within a range of about ±45 degrees from a central position of a connector portion where a plurality of the external power source wiring portions are located in a circumferential direction around a center axis of the inner hole.

* * * * *